United States Patent
Ageta et al.

(10) Patent No.: US 7,308,654 B2
(45) Date of Patent: Dec. 11, 2007

(54) INFORMATION PROCESSING APPARATUS, MENU PROCESSING METHOD AND RECORDING MEDIUM STORING A MENU PROCESSING PROGRAM

(75) Inventors: Masato Ageta, Kawasaki (JP); Chikako Kariya, Kawasaki (JP); Toshihisa Masuzawa, Inagi (JP); Yuji Aoyama, Kawasaki (JP); Hisashi Ohki, Kawasaki (JP); Mitsuru Kodama, Kawasaki (JP); Ryoji Hirayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 09/765,633

(22) Filed: Jan. 22, 2001

(65) Prior Publication Data

US 2002/0018080 A1     Feb. 14, 2002

(30) Foreign Application Priority Data

Aug. 3, 2000    (JP)   ............................ 2000-235806

(51) Int. Cl.
*G06F 3/00* (2006.01)
(52) U.S. Cl. ................ 715/810; 715/779; 715/825; 715/826; 715/827
(58) Field of Classification Search ........ 345/810–845, 345/156–157, 160–163, 168–169; 715/810, 715/845, 781, 783, 973, 779, 825–827
See application file for complete search history.

(56) References Cited

U.S. PATENT DOCUMENTS

| | | | |
|---|---|---|---|
| 5,241,655 A * | 8/1993 | Mineki et al. .............. 715/835 |
| 5,708,787 A * | 1/1998 | Nakano et al. ............. 345/841 |
| 5,781,246 A * | 7/1998 | Alten et al. .................... 725/40 |
| 5,784,060 A * | 7/1998 | Bertram et al. ............. 715/840 |
| 5,790,120 A * | 8/1998 | Lozares et al. ............. 715/779 |
| 5,796,404 A * | 8/1998 | Gentner ...................... 715/823 |
| 5,822,123 A * | 10/1998 | Davis et al. ................... 725/43 |
| 5,973,688 A * | 10/1999 | May ............................ 715/709 |
| 5,990,884 A * | 11/1999 | Douma et al. .............. 715/716 |
| 6,020,881 A * | 2/2000 | Naughton et al. .......... 715/740 |
| 6,078,323 A * | 6/2000 | Gest ............................ 715/711 |
| 6,160,926 A * | 12/2000 | Dow et al. ................... 382/313 |
| 6,262,722 B1 * | 7/2001 | Allison et al. ................ 725/39 |
| 6,314,570 B1 * | 11/2001 | Tanigawa et al. ............ 725/40 |
| 6,603,488 B2 * | 8/2003 | Humpleman et al. ....... 715/771 |
| 6,907,577 B2 * | 6/2005 | Tervo ......................... 715/827 |

FOREIGN PATENT DOCUMENTS

| | | |
|---|---|---|
| DE | 29723761 U1 | 5/1999 |
| EP | 0946028 A2 | 9/1999 |
| EP | 1006477 A2 | 6/2000 |
| JP | 2000-10702 | 1/2000 |
| JP | 2000-155645 | 5/2000 |
| WO | 98/43202 | 10/1998 |

* cited by examiner

*Primary Examiner*—Sy D. Luu
(74) *Attorney, Agent, or Firm*—Staas & Halsey LLP

(57) ABSTRACT

Characteristic menu information corresponding to applications are stored in a menu storage unit. A menu development unit discriminates an application which is now started and develops a menu corresponding to the application on a screen using the stored menu information. In the menu operation, a menu is developed on the screen by operating a defined button, a menu item is selected by scrawling while the menu is being developed and the selected menu item is executed by operating the defined button.

31 Claims, 14 Drawing Sheets

F I G. 1
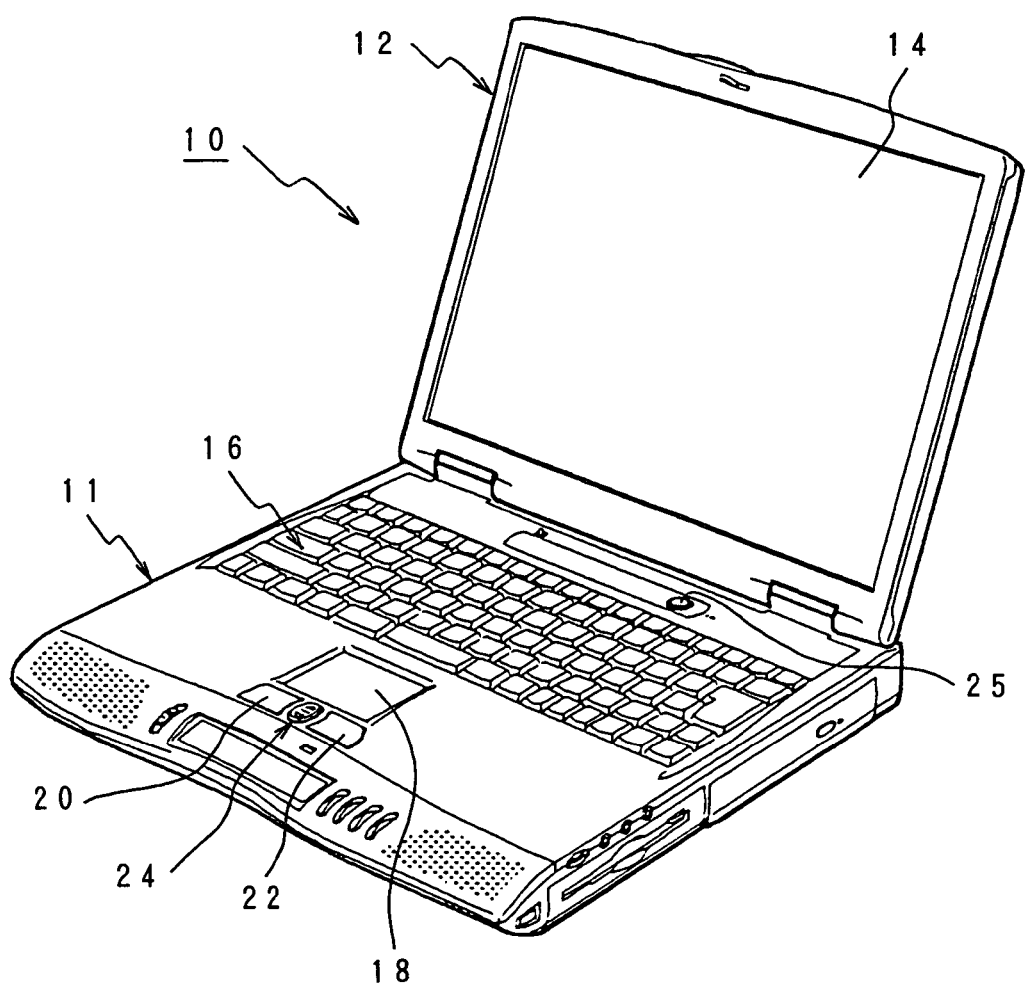

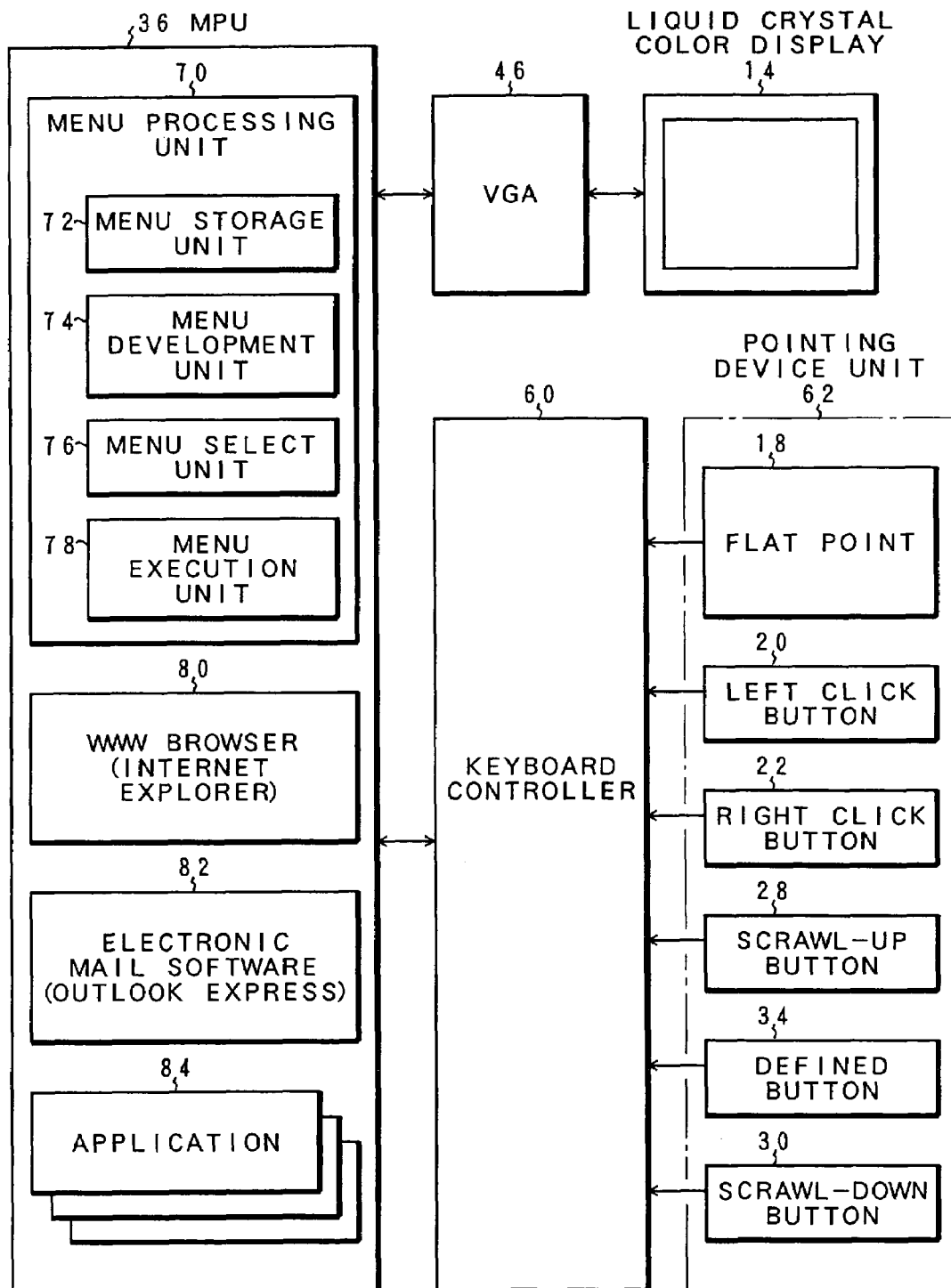
F I G. 5

FIG. 7

```
[¥Settings]
IMenuTotalNum = 6
IMenu00Name = "BACK"
IMenu00Key = 00002512
IMenu01Name = "NEXT"
IMenu01Key = 00002712
IMenu02Name = "UPDATE (RELOAD)"
IMenu02Key = 00005211
IMenu03Name = "CANCEL"
IMenu03Key = 0000001b
IMenu04Name = "HOME"
IMenu04Key = 00002412
IMenu05Name = "ADD TO FAVORITE"
IMenu05Key = 00004411
```

[¥Settings]

MMenuTotalNum = 6

MMenu00Name = "SEND/RECEIVE"

MMenu00Key = "0x4D"

MMenu01Name = "REPLY"

MMenu01Key = "0x52"

MMenu02Name = "FORWARD"

MMenu02Key = "0x46"

MMenu03Name = "PREVIOUS ITEM"

MMenu03Key = "0x3C"

MMenu04Name = "NEXT ITEM"

MMenu04Key = "0x3E"

MMenu05Name = "PRINT"

MMenu05Key = "0x50"

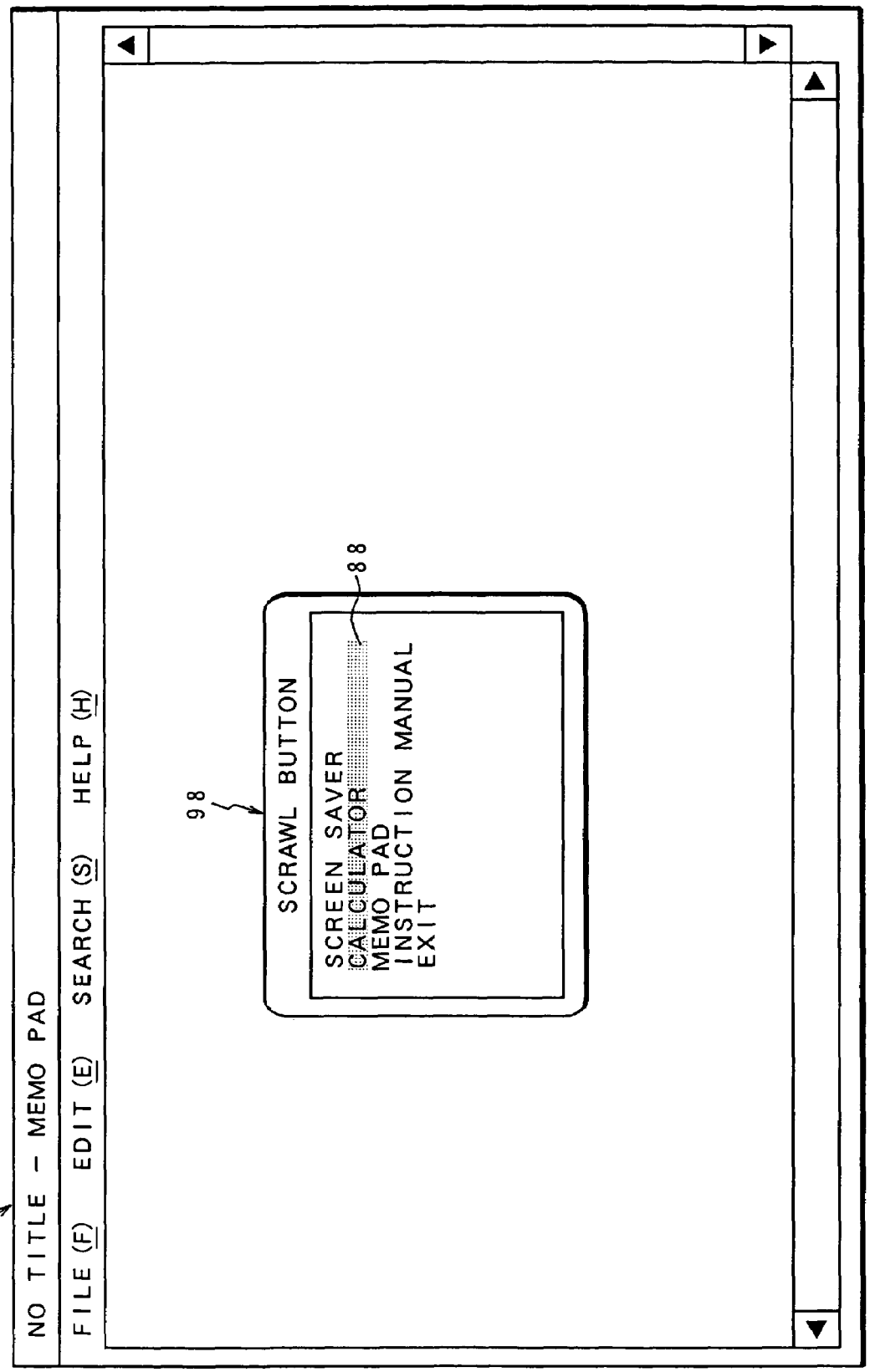

[¥Settings]

PMenuTotalNum = 4

PMenu00Name = "SCREEN SAVER"

PMenu00Program = SEARCH_SAVER

PMenu00Folder = ""

PMenu00CmdLine = ""

PMenu01Name = "CALCULATOR"

PMenu01Program = CALC.EXE

PMenu01Folder = ""

PMenu01CmdLine = ""

PMenu02Name = "MEMO PAD"

PMenu02Program = NOTEPAD.EXE

PMenu02Folder = ""

PMenu02CmdLine = ""

PMenu03Name = "INSTRUCTION MANUAL"

PMenu03Program = Fmvomv.exe

PMenu03Folder = ""

PMenu03CmdLine = ""

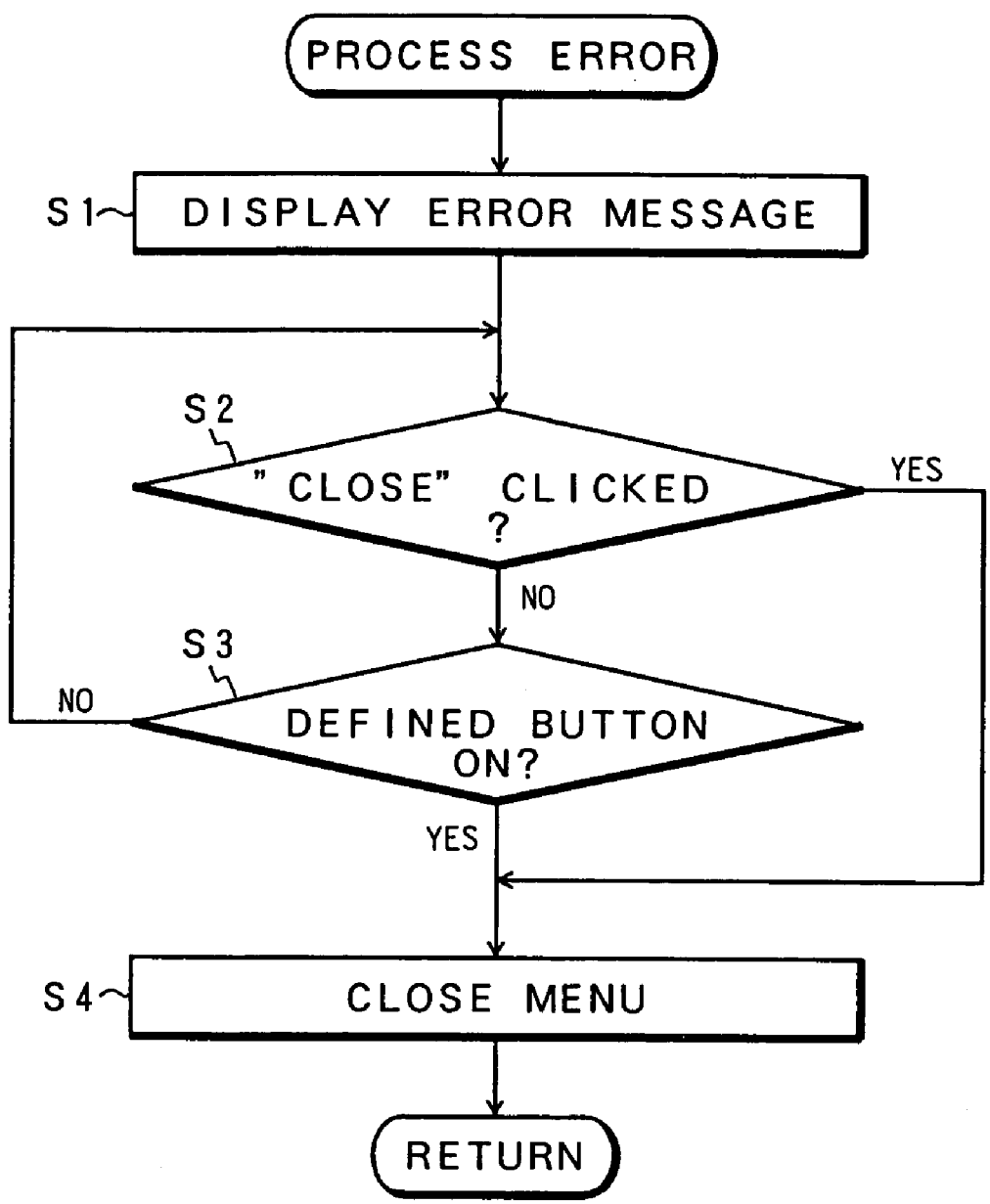

INFORMATION PROCESSING APPARATUS, MENU PROCESSING METHOD AND RECORDING MEDIUM STORING A MENU PROCESSING PROGRAM

BACKGROUND OF THE INVENTION

1. Field of the Invention

The present invention relates to an information processing apparatus, a menu processing method and a recording medium storing a menu processing program. The present invention particularly relates to an information processing apparatus, a menu processing method and a recording medium storing a menu processing program capable of developing, selecting and executing a menu provided to correspond to an application.

2. Description of the Related Art

In recent years, notebook-size personal computers and the like, a flat pointer and left and right click buttons serving as contact operation type pointing devices are arranged in front of a keyboard, and a mouse pointer on a screen is operated by the operation of the flat point, to thereby move to the operation items of a menu bar and to allow the operation of a selected item to be executed by the left click button. Further, some personal computers are provided with not only the flat point and the left and right click buttons but also a scrawl-up button and a scrawl-down button for performing a scrawl operation on the screen, whereby a display content can be easily, promptly scrawled up and down on an application screen using the scrawl-up and scrawl-down buttons without the need to operate the mouse pointer by means of the flat point. For example, if a previous screen is to be returned while viewing a home page through a WWW browser such as the Internet Explorer of Microsoft Corp., the mouse pointer is moved to a menu item "RETURN" on a menu bar on the upper portion of the screen by the operation of the flat point, and the left click button is depressed to select the item.

However, the conventional operations of selecting and executing a menu requires an operation for moving the mouse pointer to the menu bar displayed on the upper portion or the like of the screen by an application using the flat pointer. Depending on the position of the mouse pointer at that moment, the mouse pointer is sometimes moved greatly from one corner to the other of the screen. The operation becomes particularly complicated for the menu which is operated frequently. Thus, it is disadvantageously difficult to promptly, rhythmically operate the mouse pointer. Further, the selection of a desired menu item can be executed by using a shortcut menu displayed by operating the right click button without performing an operation for selecting a desired menu from a menu bar displayed on the upper portion or the like of the screen. However, at the time of selecting the desired menu item on the shortcut menu, it is necessary to move the mouse pointer by operating the flat point. In addition, according to a multiwindow system, a plurality of windows corresponding to applications are displayed on the screen. If a menu operation is carried out in the multiwindow system, it is necessary to move the mouse pointer to the display region of a window corresponding to a desired application by operating the flat point. Then, a selection operation for activating the window is carried out and the shortcut menu is displayed, whereby the application controls the display of a corresponding shortcut menu. This is common to all operations using not only the flat point but also other pointing devices such as a mouse. In that case, a user needs to frequently conduct mouse pointer moving operation, which disadvantageously prevents operations from being efficiently fulfilled.

SUMMARY OF THE INVENTION

According to the present invention, there is provided an information processing apparatus, a menu processing method and a recording medium storing a menu processing program capable of simply, easily operating a menu.

An information processing apparatus according to the present invention is characterized by comprising: a menu storage unit storing characteristic menu information corresponding to applications; and a menu development unit discriminating an application which is now started and developing a menu corresponding to the application on a screen using the menu information. Thus, by developing the menu on the screen, it is not necessary to move a mouse pointer on the screen by the operation of a flat point or a mouse, thereby making it possible to simply, easily conduct a menu operation.

Further, the information processing apparatus according to the present invention comprises a menu execution unit executing a processing corresponding to a menu item selected from the menu. In addition, if the application for which the menu information exists is started, the information processing apparatus according to the present invention activates this application. As for this activation, it is not necessary to operate the mouse pointer on the screen and a user does not need to recognize the activation operation. The menu development unit develops a predetermined menu on the screen if an application which does not store the menu information is started or no application is started. This predetermined menu is a launcher menu for starting the applications. If a menu item is determined from the menu, the menu is deleted from the screen. The information processing apparatus according to the present invention further comprises an indication unit indicating development of the menu, and the menu development unit discriminates the started application if indication of the indication unit is detected. This indication unit is a device consisting of a scrawl-up button and a scrawl-down button for changing selection of the menu item from the menu and a defined button for determining the selected menu item. The defined button is operated to thereby indicate the development of the menu. The defined button is arranged between the scrawl-up button and the scrawl-down button. Due to this, a processing function realized by operating the application menu can be easily, promptly executed by the operation of the three buttons concentrated on one portion. The scrawl-up button and the scrawl-down button are a seesaw switch provided with a pair of switch contacts operating by depressing one of operation regions on both ends of a switch knob, and the defined button is a push button switch arranged in a hole formed at a center of the switch knob. Further, the indication unit is provided in front of a keyboard. The information processing apparatus according to the present invention consists of a cover on which a display is arranged; a main body on which the keyboard is arranged; and a coupling section coupling the cover to the main body.

Further, the present invention provides a menu processing method for developing a menu on a screen. This menu processing apparatus is characterized by comprising the steps of: discriminating an application which is now started; and developing a menu corresponding to the application based on a discrimination result while using characteristic menu information corresponding to the application. The menu processing method according to the present invention comprises the step of executing a processing corresponding to a menu item selected from the menu. If the application for which the menu information exists is started, the application is activated. A predetermined menu is developed on the screen if an application, for which the menu information exists, is started or no application is started. This predetermined menu is a launcher menu for starting the applications. In the menu processing method according to the present invention, if a menu item is determined from the menu, the menu is deleted from the screen. The menu processing method according to the present invention further comprises the step of indicating development of the menu, and the started application is discriminated if an indication is detected.

Moreover, the present invention provides a computer readable recording medium recording a menu processing program. The menu processing program recorded on this recording medium allows a computer to execute the steps of: discriminating an application which is now started; and developing a menu corresponding to the application based on a discrimination result while using characteristic menu information corresponding to the application. The menu processing program conducts a processing corresponding to a menu item selected from the menu. If the application for which the menu information exists is started, the menu processing program activates the application. If an application, for which the menu information exists, is started or no application is started, the menu processing program allows the computer to execute the development of a predetermined menu on the screen. This predetermined menu is a launcher menu for starting the applications. If a menu item is determined from the menu, the menu processing program allow the computer to execute the deletion of the menu from the screen. The menu processing program on the recording medium allows the computer to execute the detection of an indication of the development of the menu and the discrimination of the started application if detecting this indication.

The above and other objects, features, and advantages of the present invention will become more apparent from the following detailed description with reference to the drawings.

BRIEF DESCRIPTION OF THE DRAWINGS

FIG. 1 is a perspective view of an information processing apparatus according to the present invention;

FIG. 5 is a block diagram of the functional constitution for a menu processing according to the present invention;

FIG. 7 is an explanatory view for the data structure of a menu list used in FIG. 6;

FIG. 9 is an explanatory view for the data structure of a menu list used in FIG. 8;

FIG. 10 is an explanatory view for the menu operation of the present invention on an application screen on which no menu is prepared;

FIG. 11 is an explanatory view for the data structure of a menu list used in FIG. 10;

FIG. 14 is a flow chart for an error processing shown in FIG. 13.

DETAILED DESCRIPTION OF THE PREFERRED EMBODIMENT

Figure 2:
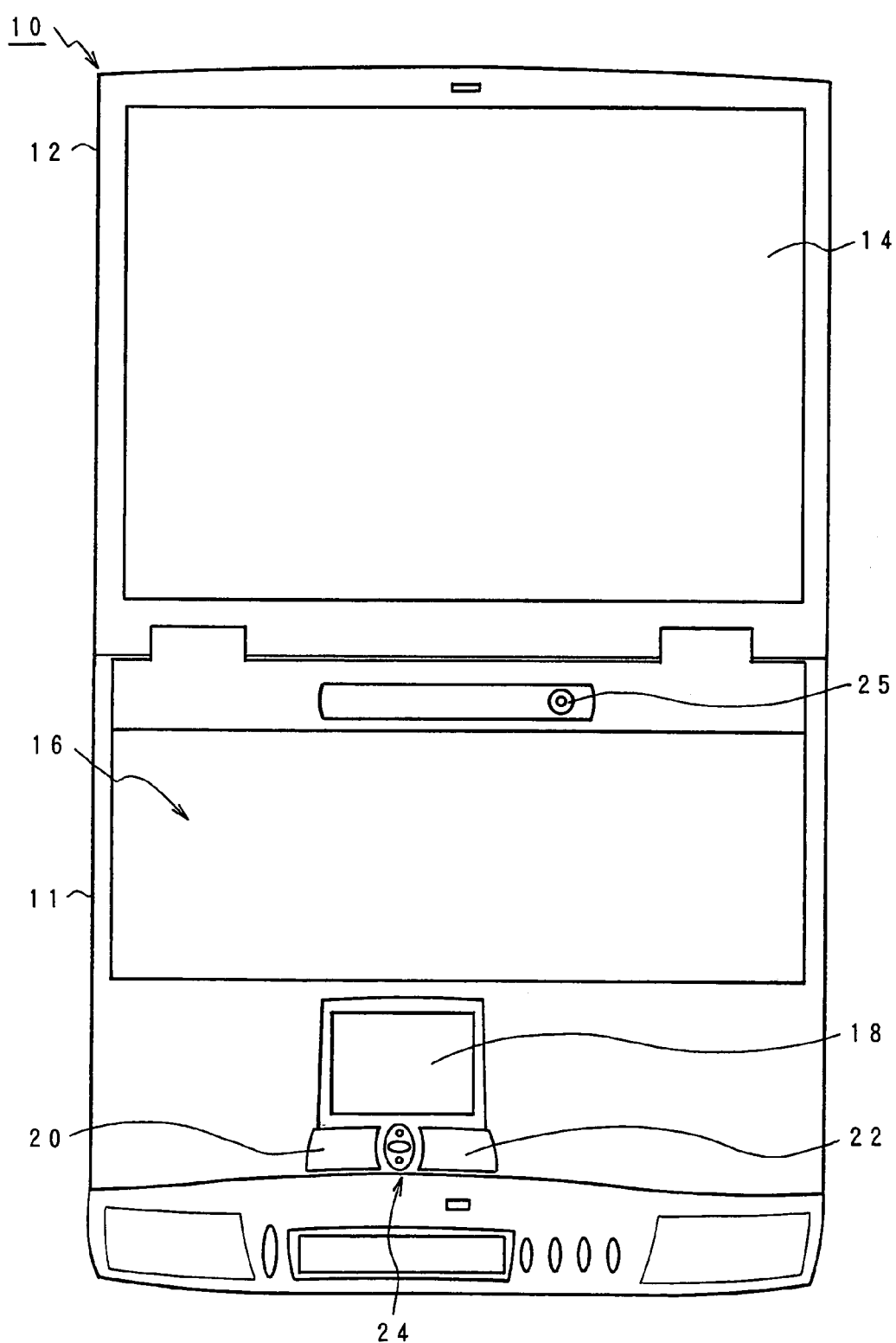
FIG. 2 is a plan view showing a state in which a cover shown in FIG. 1 is opened.

FIG. 1 is a perspective view of an information processing apparatus to which the present invention is applied, while taking a notebook-size personal computer as an example. The information processing apparatus 10 according to the present invention consists of a main body 11 and a cover 12. The cover 12 is coupled to the main body 11 so that the cover 12 can be freely opened and closed. A liquid crystal color display 14 is arranged on the inner surface of the cover 12. A keyboard 16 is provided on the main body 11. A flat point 18 operating a mouse pointer on the liquid crystal color display 14, and a left click button 20 and a right click button 22 corresponding to the left button and right button of a mouse, respectively are provided in front of the keyboard 16. A scrawl switch unit 24 is provided between the left click button 20 and the right click button 22.

FIG. 2 is a plan view showing a state in which the cover 12 is opened to a horizontal level in the information processing apparatus 10 shown in FIG. 1. In FIG. 2, the keyboard 16 is not shown. The flat point 18 is arranged in front of the keyboard 16 of the main body 11, the left click button 20 and the right click button 22 are arranged in front of the flat point 18, and the scrawl switch unit 24 is arranged between the left click button 20 and the right click button 22.

Figure 3:
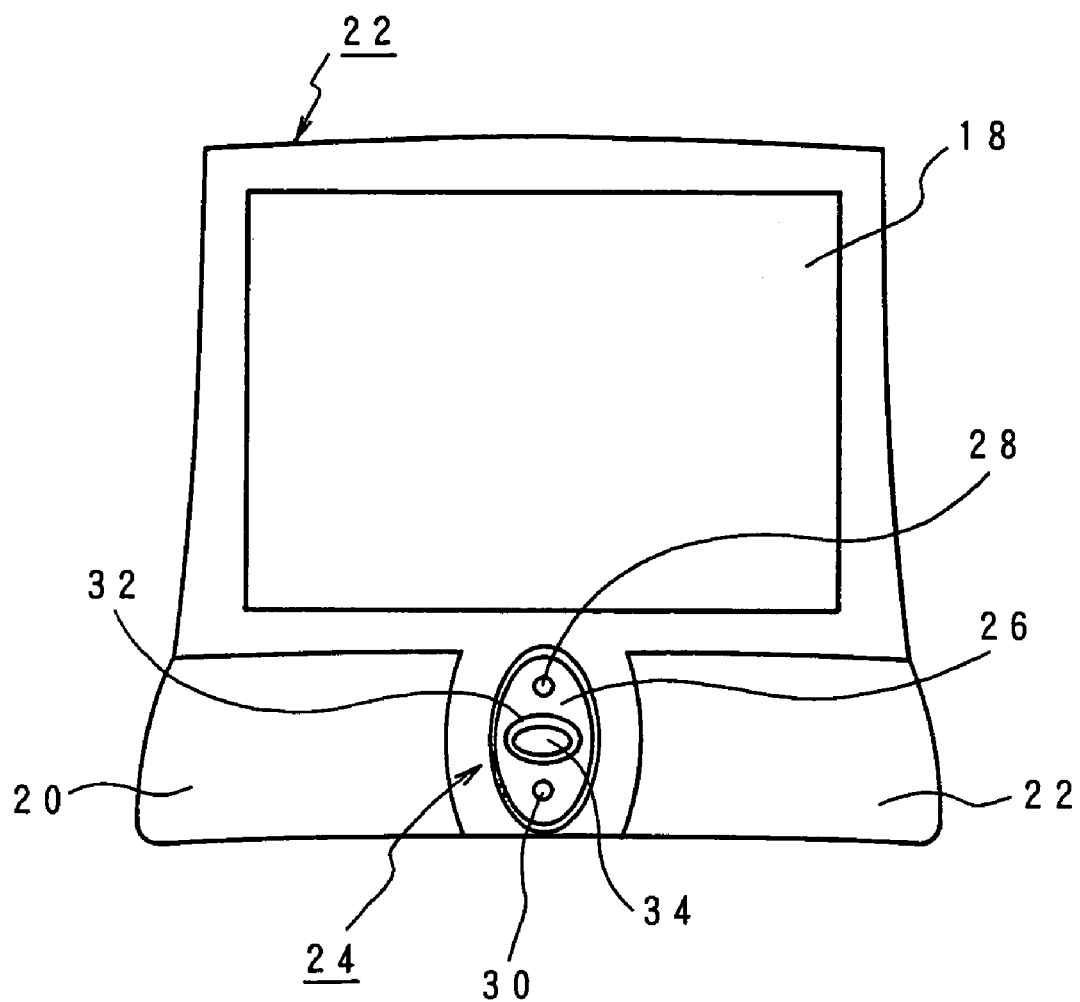
FIG. 3 is an explanatory view for a menu switch unit shown in FIG. 1 which is taken out and enlarged.

FIG. 3 is an explanatory view showing that the scrawl switch unit 24 shown in FIGS. 1 and 2 is taken out and enlarged together with the left click button 20, the right click button 22 and the flat point 18. The scrawl switch unit 24 is provided with an ellipsoidal seesaw knob 26. Regions indicated by round protrusions on the both sides of the seesaw knob 26 are a scrawl-up button 28 and a scrawl-down button 30. A pair of push button switch structures corresponding to the scrawl-up button 28 and the scrawl-down button 30, respectively, are provided below the seesaw knob 26. By depressing the scrawl-up button 28, the seesaw knob 26 is swung to thereby turn on an up-switch provided below the scrawl-up button 28. By depressing the scrawl-down button 30, the seesaw knob 26 is swung oppositely to thereby turn on a down-switch provided below the scrawl-down button 30. According to the present invention, in addition to the scrawl-up button 28 and the scrawl-down button 30, a through hole 34 is formed in the central portion of the seesaw knob 26 and a defined button 34 is newly provided in the through hole 32. A center switch is arranged below the defined button 34. By depressing the defined button 34, the center switch below the defined button 34 can be turned on.

Figure 4:
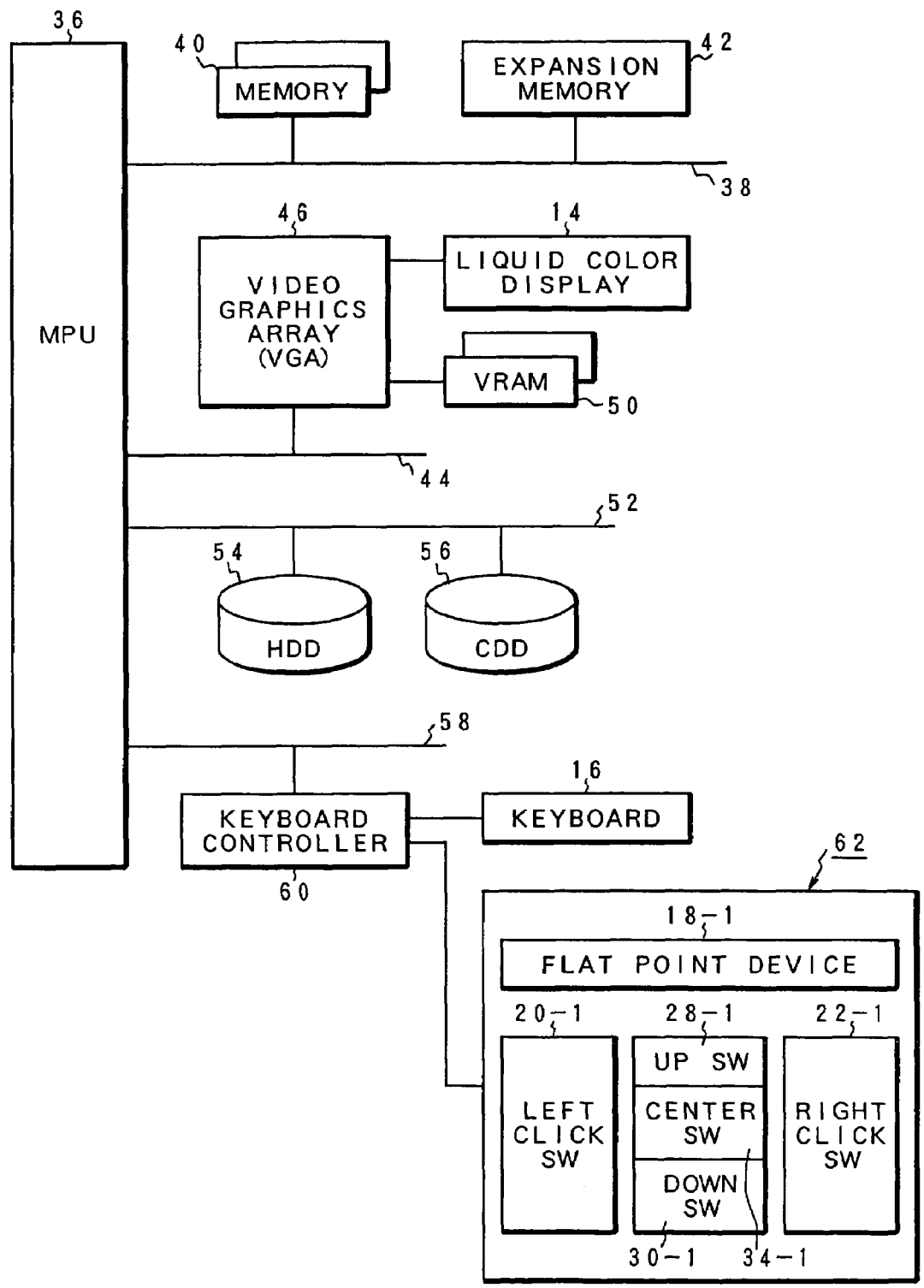
FIG. 4 is a block diagram of the hardware constitution of the information processing apparatus shown in FIG. 1.

FIG. 4 is a block diagram showing one example of the basic hardware constitution of the information processing apparatus according to the present invention shown in FIGS. 1 and 2. The information processing apparatus according to the present invention has an MPU 36. An on-board memory 40 and an expansion memory 42, provided at need, are connected to a memory bus 37 from the MPU 36. Further, a video graphics array (VGA) 46 which functions as a display control unit is connected to a PCI bus 44 from the MPU 36. The liquid crystal color display 14 and a VRAM 50 are connected to the video graphics array 46. A hard disk drive (HDD) 54 and a CD drive (CDD) 56 are connected to an ATA bus 52 from the MPU 36. Also, a keyboard controller 60 is connected to an X bus 58 from the MPU 36. The keyboard 16 and a pointing device unit 62 are connected to the keyboard controller 60. The pointing device unit 62 is provided with a flat point device 18-1 corresponding to the flat point 18 shown in FIG. 3, and a left click switch 20-1 and a right click switch 22-1 corresponding to the left click button 20 and the right click button 22, respectively. Further, the pointing device unit 62 is provided with an up-switch 28-1, a down-switch 30-1 and a center switch 34-1 corresponding to the scrawl-up button 28, the scrawl-down button 30 and the defined button 34 of the scrawl switch unit 24, respectively.

FIG. 5 is a block diagram of a functional constitution realizing a menu processing conducted to applications realized by the operations of the scrawl-up button 28, the scrawl-down button 30 and the defined button 34 arranged on the scrawl switch unit 24 provided by the information processing apparatus of the present invention. It is noted that in the information processing apparatus of the present invention, respective applications operate on a multiwindow system having multitask.

In FIG. 5, a menu processing unit 70 is provided on the MPU 36. The menu processing unit 70 consists of a menu storage unit 72, a menu development unit 74, a menu selection unit 76, and a menu execution unit 78. Also, on the MPU 36, a WWW browser 80 such as Internet Explorer of Microsoft Corp. operating as an Internet browser software, and an electronic mail software 82 such as Outlook Express of Microsoft Corp. are executed as specific applications. By an operator's operation, the WWW browser 80 or the electronic mail software 82 is started to allow browsing the Internet or conducting electronic mail operation. Besides the WWW browser 80 and the electronic mail software 82, an appropriate application 84 is installed on the MPU 36 and can be executed by the MPU 36 if a user designates the application 84. In contrast to the MPU 36 side, the scrawl-up button 28, the scrawl-down button 30 and the defined button 34 are provided for an operation for allowing the menu processing unit 70 to executes processings are provided on the pointing device unit 62 through the keyboard controller 60. The flat point 18, the left click button 20 and the right click button 22 are also provided on the pointing device unit 62 for the operations using an ordinary mouse pointer other than the menu scrawl processing. If the menu processing unit 70 on the MPU 36 provided by the present invention recognizes that the defined button 34 is turned on while the application is running, then a menu prepared in advance and corresponding to the application is developed on the liquid color display 48. If the menu processing unit 70 recognizes that the scrawl-up button 28 or the scrawl-down button 30 is operated in a state in which the menu is being developed, then the unit 70 selects a menu item by moving a cursor provided on the menu. Further, if the menu processing unit 70 recognizes that the defined button 34 is operated in a state in which the menu is being developed, then the unit 70 executes the menu item selected by the cursor at that moment. To this end, the menu storage unit 72 stores menu lists prepared in advance and corresponding to, for example, the WWW browser 80 and the electronic mail software 82. The menu storage unit 72 also stores a menu list for a launcher menu used while no application is running or an application 84 for which no menu is prepared is running. If recognizing that the defined button 34 is turned on, the menu development unit 74 reads a menu corresponding to the application running at that time and displayed on the liquid color display 14 from the menu storage unit 72, and develops and displays a menu window on the liquid color display 14. The menu development unit 74 also activates the corresponding application simultaneously with the development of the menu. The activation of the application at the time of developing the menu is effective if an application for which a menu list is prepared and an application for which no menu list is prepared are simultaneously started. For example, the WWW browser 80 is started first and then the other application 84 is started, the screen of the application 84 is displayed and turns into an active state in which a user can select a function or carry out an operation such as data input, while the screen of the WWW browser 80 is in an inactive state. In this state, if the menu development unit 74 recognizes that the defined button 34 is turned on, the WWW browser 80 for which a menu list is prepared is activated, displayed on the front surface and then a menu window is displayed thereon according to the present invention. The activation is made by issuing a command by an application interface API according to, for example, Windows which is the operating system or OS of Microsoft Corp. This is the same as a case where the electronic mail software 82 is started first and then the other application 84 is started. If the menu development unit 74 recognizes that the defined button 34 is turned on, the electronic mail software 82 for which a menu list is prepared is activated and a mail screen is switched to a front screen on which the menu window is displayed. Further, if the WWW browser 80 and the electronic mail software 82 for which menu lists are prepared, respectively, are started, priority is given over, for example, the WWW browser 80. If the menu development unit 74 recognizes that the defined button 34 is turned on, the WWW browser 80 may be activated and the menu window thereof may be displayed. In this way, by activating an application corresponding univocally at the time of displaying a menu, it is judged whether or not the application is activated, making it unnecessary to carry out a processing on a program for activating the application if it is not activated and allowing a processing to be simplified and made faster accordingly. If the menu selection unit 76 recognizes that either the scrawl-up button 28 or the scrawl-down button 30 is operated in a state in which the menu window of the application at that time is developed on the liquid crystal color display 14, then the unit 76 scrawls up or down a cursor in the menu window and selects a menu item. If the menu execution unit 78 recognizes that the defined button 34 is turned on in a state in which the menu window is developed and displayed on the application screen on the liquid color display 14, then the unit 78 executes the menu selected by the cursor at that time.

Figure 6:
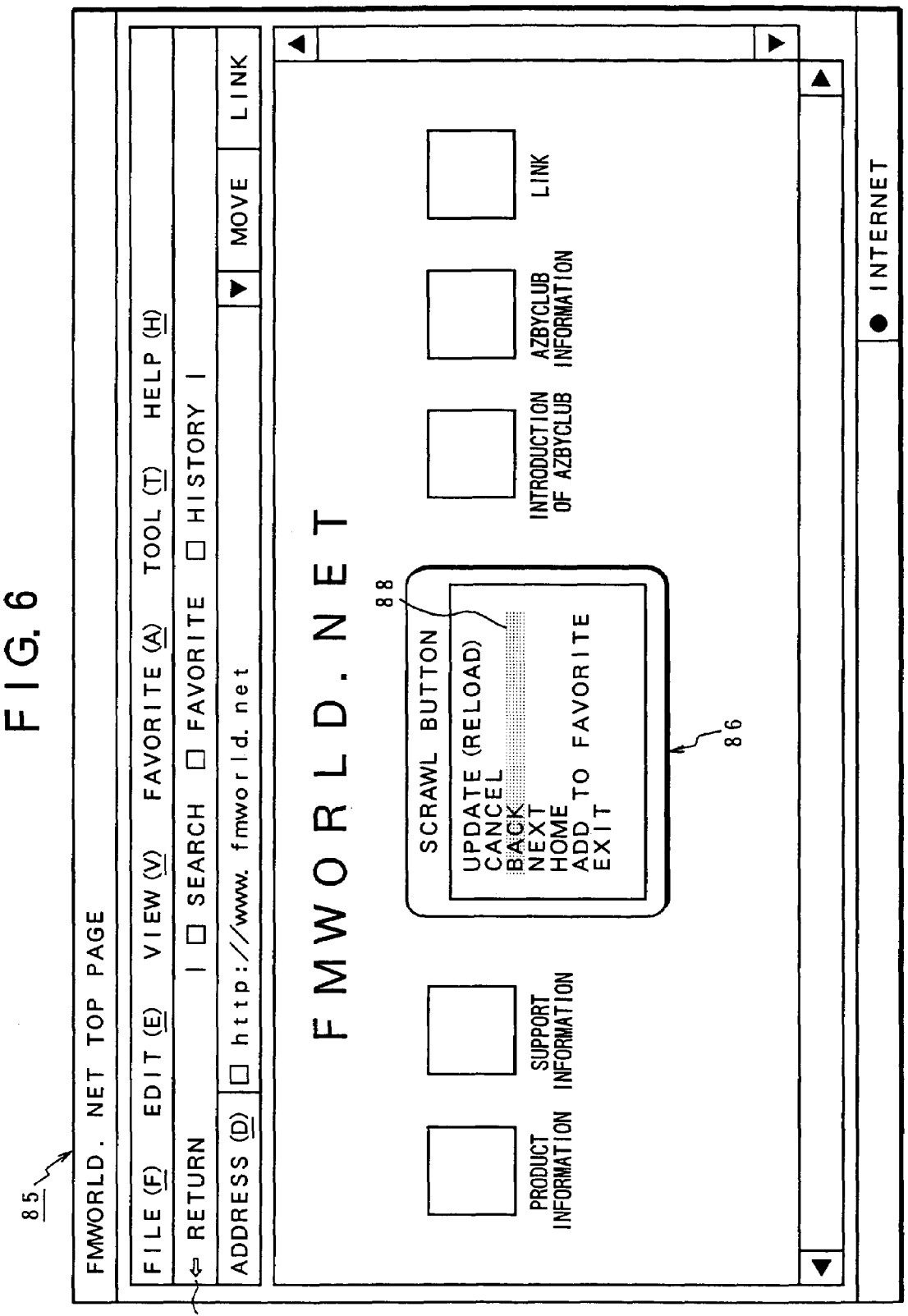
FIG. 6 is an explanatory view for the menu operation according to the present invention on an Internet view screen.

FIG. 6 is an explanatory view for the display of a menu according to the present invention on the Internet view screen 85 after the menu processing unit 70 shown in FIG. 5 started the WWW browser 80. On this Internet view screen 85, a homepage at an address set by a user by, for example, starting Internet Explorer provided by Windows is referred to. If the user turns on the defined button 34 while the Internet view screen 85 is being used, the menu processing unit 70 activates the WWW browser 80 running as the application of this time, reads a menu list corresponding to the application or the WWW browser 80 from the menu storage unit 72 and displays the menu window 86 at the center of the liquid color display 14. On the menu window 86, "update (reload)", "cancel", "return", "go", "home" and "add to favorite" are displayed as menu items and "exit" is also displayed as a menu operation item. Further, a cursor 88 is displayed on the menu window 86. The cursor 88 is set on the uppermost menu "update (reload)" in an initial state in which the menu window 86 is opened. By operating the scrawl-down button 30 in that state, the cursor 88 can be scrawled down. By operating the scrawl-up button 28, the cursor 88 can be scrawled down. If the defined button 34 is turned on again while such a menu window 86 is displayed and the cursor 88 selects a menu item, in an example shown in FIG. 7, a command corresponding to the menu item of "return" selected when the cursor 88 is set is issued and the mouse pointer is moved to the menu item "return" provided on the menu bar 87 on the upper side of the Internet view screen 85, thereby making it possible to carry out the same screen operation as that of the right click button 20.

FIG. 7 is an explanatory view for a menu list 90 used to display the menu window 86 on the Internet view screen 85 shown in FIG. 6. This menu list 90 defines the number of menu items "ImenuTotalMum", menu item names "IMenuxxName" and commands issued by selecting and executing menu items "IMenuxxKey". In this case, the number of menu items is six, so that menu items xx=00 to 05 are used. As for commands "IMenuxxKey" corresponding to the menu items, the key codes of a shortcut key (e.g., "ALT" key+"B" key) preset to correspond to the respective menu items of the Internet view screen 85 are used. Using such a menu list 90, the description of the right side of "IMenuxxName" is displayed as the menu item of the menu window 86 and the key code which is the description of the right side of "IMenuxxKey" is used to issue a command corresponding to the application.

Figure 8:
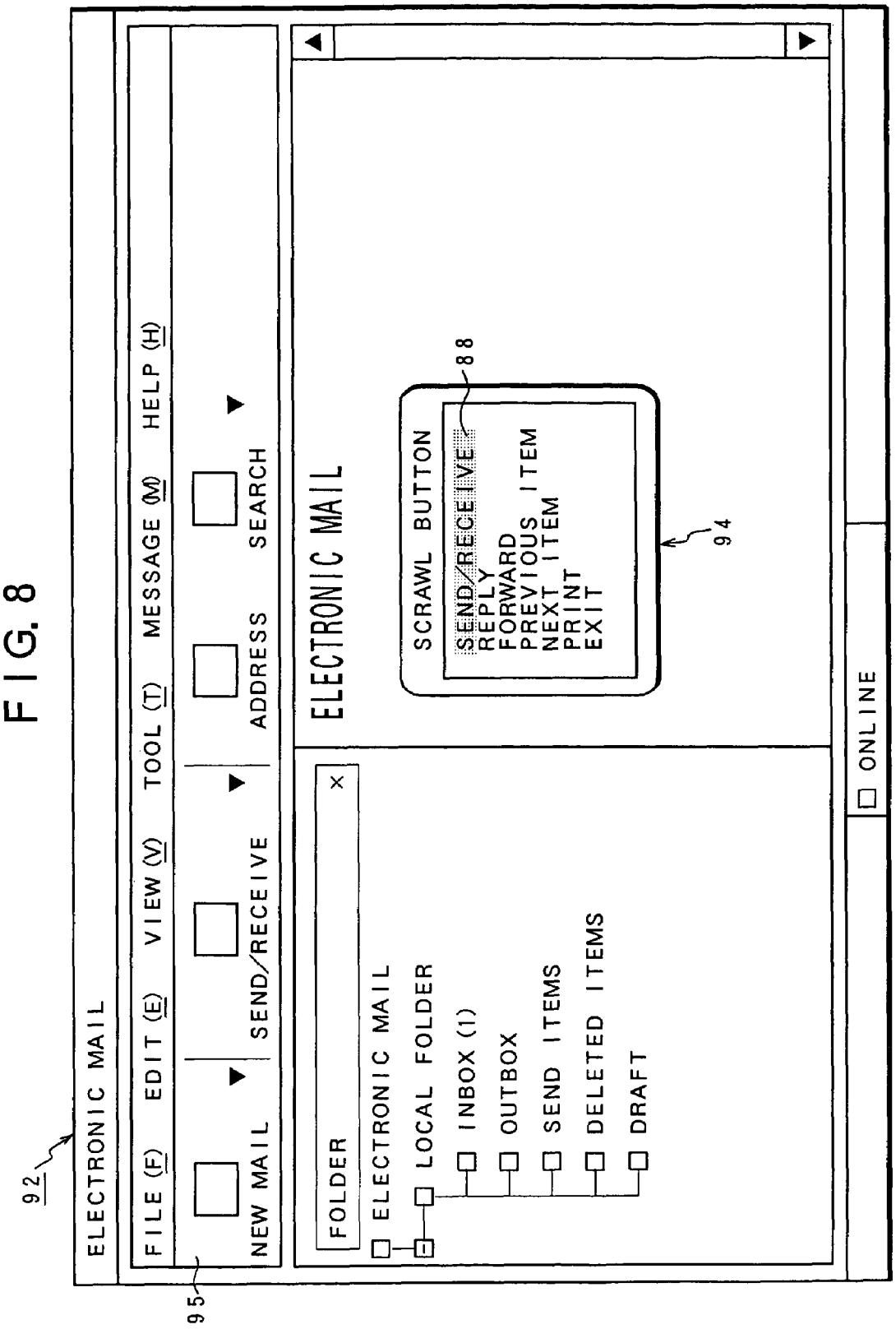
FIG. 8 is an explanatory view for the menu operation of the present invention on an electronic mail screen.

FIG. 8 is an explanatory view for the menu processing of the present invention on the electronic mail screen 92 displayed after the electronic mail software 82 such as Outlook Express is executed by the MPU 36 shown in FIG. 6 as an application. If the user turns on the defined button 34 while this electronic mail screen 92 is being displayed, then the electronic mail software 82 is activated and, at the same time, a menu window 94 prepared in advance and corresponding to the electronic mail software 82 is displayed at the center of the electronic mail screen 92. The menu items of the menu window 94 corresponding to the electronic mail software 82 of, for example, six menu items of "send/receive", "reply", "forward", "previous item", "next item", and "print" are displayed and "exit" for operating the menu is finally displayed. Further, if displaying the menu window 94, the cursor 88 is set on the uppermost menu item "send/receive" as default. By operating either the scrawl-up button 28 or the scrawl-down button 30 while the menu window 94 is displayed on the electronic mail screen 92, the cursor 88 is scrawled up or down and an arbitrary menu item can be selected. If a necessary menu item can be selected by the cursor 88 and the defined button 34 is turned on again, then a command corresponding to the menu item selected by the cursor 88 is issued and an operation corresponding to the menu item is executed. For example, if the defined button 34 is turned on in a state in which the cursor 88 selects the menu item "send/receive", then it is possible to carry out the same operation of the electronic mail screen 92 as that of moving the mouse pointer to the menu item "send/receive" provided on the menu bar 95 on the upper side of the electronic mail screen 92 and operating the left click button 20.

FIG. 9 is an explanatory view for a menu list 96 used to display the menu window 94 on the electronic mail screen 92 shown in FIG. 8. The menu list 96 defines, as in the case of the menu list 90 on the menu window 86 on the Internet view screen 85 shown in FIG. 8, the numbers of menu items "MmenuTotalMum", menu item names "MMenuxxName" and commands issued to correspond to the menu item names "MMenuxxKey".

FIG. 10 is an explanatory view for the menu processing of the present invention which processing is carried out if no application is executed or the application 84 for which no menu is prepared, such as the WWW browser 80 or the electronic mail software 82, is executed on the MPU 36 shown in FIG. 6. FIG. 11 shows the application screen 96 if the program of, for example, application "memo pad" for which no menu is prepared is started. If the user turns on the defined button 34 on the application 96 for which no menu is prepared, the menu processing unit 70 develops and displays a menu window 98 having a launcher menu. The launcher menu of the menu window 98 has menu items, e.g., four menu items of "screen saver", "calculator", "memo pad", and "instruction manual". Also, "exit" which is an item to operate the menu is finally provided. On the launcher menu of the menu window 98, the cursor 88 is set on the uppermost menu item "screen saver" in an initial state. In this state, if either the scrawl-up button 28 or the scrawl-down button 30 is operated, the cursor 88 can be scrawled up or down and an arbitrary menu item can be selected. If the defined button 34 is turned on in a state in which the cursor 88 selects a menu item, e.g., "calculator", then the program of the menu item "calculator" is started. If the cursor 88 selects the menu item "screen saver", the screen saver which the user set at this moment is started. As for the menu item "memo pad", a calculator program according to the standard of Windows of Microsoft Corp. which is the OS, is started. Further, if the cursor 88 selects the menu item "instruction manual", the program of Users' Guide installed in the information processing apparatus is started.

FIG. 11 is an explanatory view for a menu list 100 to display the menu window 98 of the launcher menu on the application screen 96 shown in FIG. 10. The menu list 100 defines the number of menu items "PmenuTotalMum", menu item names "PmenuxxxName" and commands for starting programs corresponding to the menu item names "PMenuxxKey". Further, "PMenuxxFolder" and "PMenuxxCmdLine" define folder names and parameters designated when each program is started, respectively.

In any case of FIGS. 6, 8 and 10, the menu windows 86, 94 and 98 are automatically closed when an arbitrary menu item is selected and a command is issued or a program is executed. Further, if an error occurs when a menu item is selected and a command is issued or a program is started, an error message is displayed on the screen. If so, an operation button "close" in the error message is clicked, the menu can be finished. According to the present invention, the menu can be finished by depressing the defined button 34 while the error message is being displayed.

Figure 12:
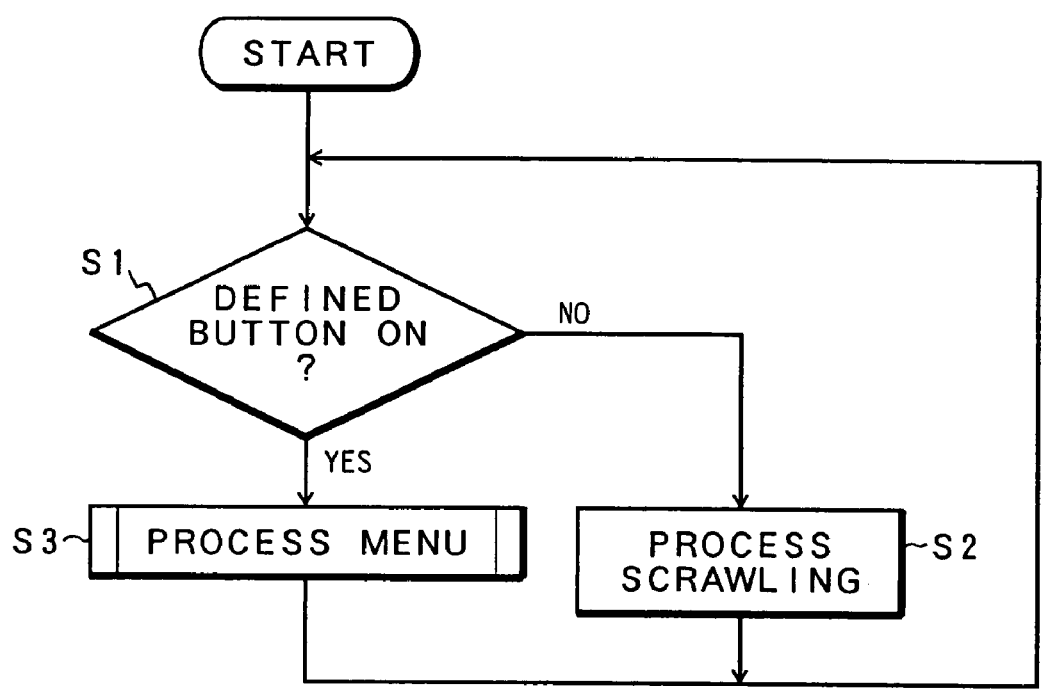
FIG. 12 is a flow chart for a processing following the operation of a scrawl switch unit according to the present invention.

FIG. 12 is a flow chart showing a basic processing operation followed by the operation of the scrawl switch unit 24 consisting of the scrawl-up button 28, the scrawl-down button 38 and the defined button 34 provided on the information processing apparatus according to the present invention. In the processing following this scrawling processing, it is monitored whether or not the defined button 34 is turned on in a step S1. If the defined button 34 is not turned on, a normal scrawl processing in accordance with the operations of the scrawl-up button 28 and the scrawl-down button 30, i.e., scrawl-up and scrawl-down operations can be carried out as in the case of a wheel operation for scrawl operation provided on a multifunctional mouse such as IntelliMouse of Microsoft Corp. in a step S2. If it is recognized that the defined button 34 is turned on in the step S1, the menu processing of the present invention is executed in a step S3.

Figure 13:
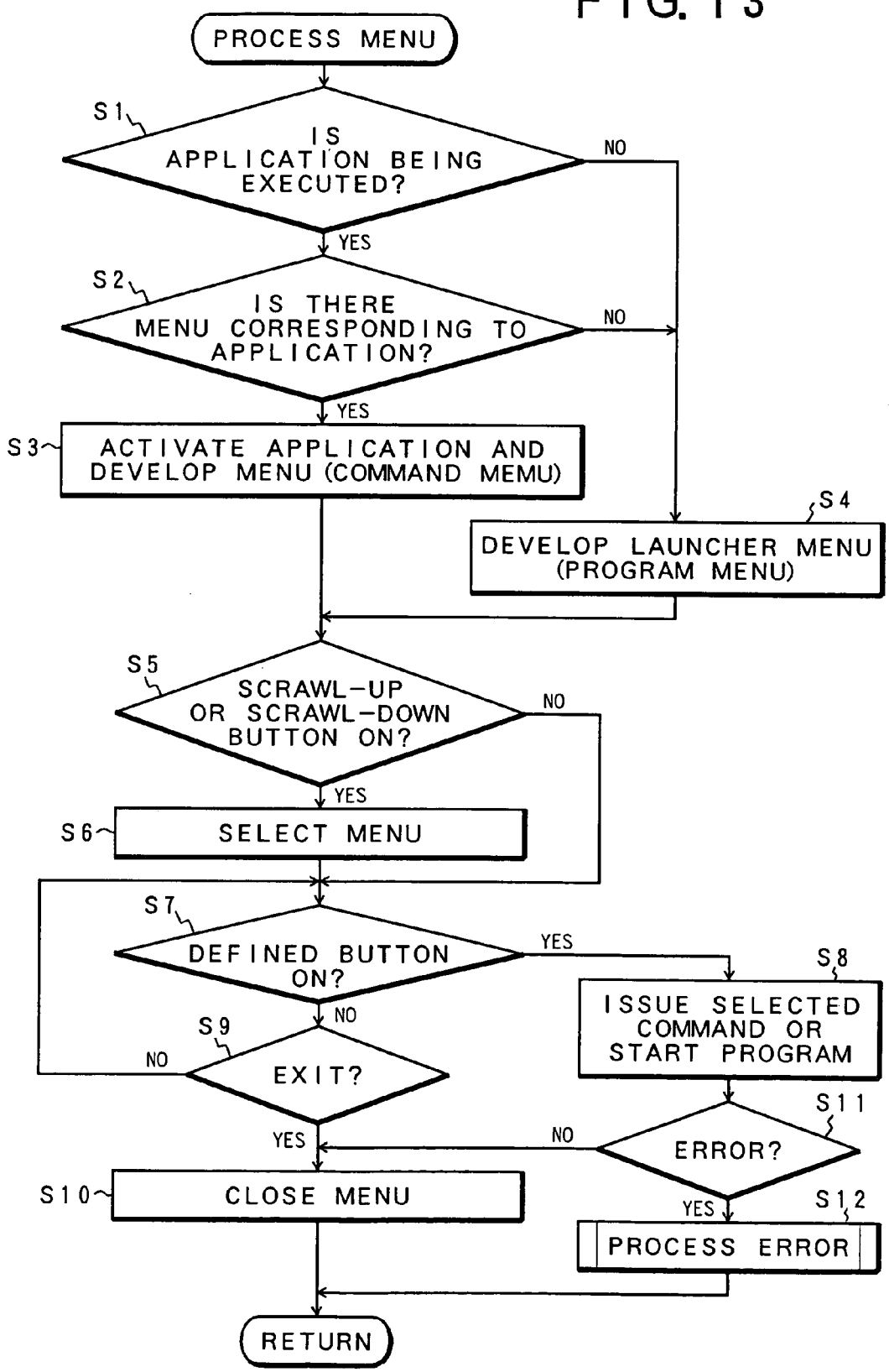
FIG. 13 is a flow chart for a menu processing shown in FIG. 12.

FIG. 13 is a flow chart showing the detail of the menu processing in the step S3 shown in FIG. 12. If the menu processing is started by turning on the defined button 34, it is first checked whether or not an application is being executed in a step S1. If an application is being executed, it is checked whether or not a menu list corresponding to the application is prepared in a step S2. Whether the application is executed and the type of the application can be discriminated by referring to a task management list created by the operating system or OS. If the menu list corresponding to the application is prepared, the application is activated and a menu corresponding to the application is developed on the screen in a step S3. If it is checked that no application is executed in the step Si or it is checked that no menu list corresponding to the application is prepared in the step S2, a launcher or application start menu is started in a step S4. If the menu corresponding to the application is developed or presented on the screen in the step S3 or the launcher menu is developed or displayed thereon in the step 54, then it is checked whether the scrawl-up button 28 or the scrawl-down button 30 is turned on in a step S5. If any one of the buttons is turned on, the cursor is moved to select a menu in a step S6. Then, it is checked whether the defined button 34 is turned on in a step S7. If it is checked that the defined button 34 is turned on in the step S7, a command selected at that time is issued or a program is started in a step S8. If the command is issued or the program is started in the step S8, the menu is closed and the processing returns to that shown in FIG. 12 in a step S10.

If the defined button 34 is not turned on in the step S7, it is checked whether or not the menu is finished in a step S9. If the defined button 34 is turned on to select the lowermost operation item "exit" on the menu which is now being developed, the end of menu is recognized and the menu is closed in the step S10.

In the step S8, the defined button 34 is turned on to thereby issue a command selected at that time or the program is started. If an error is determined in a step S11, an error processing is carried out in a step S12.

FIG. 14 is a flow chart for the error processing in the step S12 shown in FIG. 13. In this error processing, first, an error message is displayed on the screen in a step S1. Next, it is checked whether or not the operation button "close" in the error message is clicked in a step S2. If the operation button "close" is clicked, the menu is closed in a step S4 and the processing returns to that shown in FIG. 12. If the operation button "close" is not clicked in the step S2, the defined button 34 is turned on in a step S3. If it is discriminated that the defined button 34 is turned on in the step S3, the menu is closed in the step S4 and the processing returns to that shown in FIG. 12. In other words, in the error processing shown in FIG. 14, it is possible to finish the error processing by clicking the operation button "close" in the error message or by turning on the defined button 34.

Further, the present invention provides a computer readable recording medium storing a menu display program comprising the processing procedures shown in FIGS. 14 and 15. The embodiments of the recording medium include removable portable storage mediums such as a CD-ROM and a floppy disk, storage devices of a program provider providing the program through a line and memory devices such as an RAM and a hard disk, in the processing apparatus, into which the menu processing program of the present invention is installed. The menu display program provided by the storage medium of the present invention is loaded to the processing apparatus and executed on the main memory of the apparatus.

In the above embodiment, description has been given while taking, as an example, a case where menu lists are prepared for the WWW browser 80 and the electronic mail software 82, respectively and menus are displayed. Alternatively, a menu list may be prepared only for the WWW browser 80 used most frequently and a launcher menu may be displayed for applications other than the WWW browser 80.

In the alternative example, no matter which application is running, the WWW browser 80 is activated and the menu window 86 is displayed as shown in FIG. 7 by operating the defined button 34 of the switch scrawl unit 24, greatly facilitating an Internet view operation. Namely, if a menu list is displayed only for a specific application with high frequency of use, operation can be quite simplified.

Further, in the above embodiment, description has been given while taking the WWW browser 80 and the electronic mail software 82 as an example for displaying menus corresponding to applications. The present invention should not be limited to this embodiment. It is also possible to prepare a menu for an appropriate application considered to need operating menu items frequently as in the case of the WWW browser 80, to display the menu by operating the defined button 34 while the corresponding application is being executed, to select a menu item by either the scrawl-up button 28 or the scrawl-down button 30 and then to issue a command or start a program by turning on the defined button 34.

Furthermore, in the above embodiment, description has been given while taking, as an example, a switch structure in which the defined button 34 is arranged in the through hole at the center of the scrawl-up button 28 and the scrawl-down button 30 which constitute a seesaw structure. The present invention should not be limited to such a switch structure and may employ an appropriate switch structure in which a scrawl-up button 28, a defined button 34 and a scrawl-down button 30 are arranged adjacent one another in a range in which these buttons can be operated with fingers.

Moreover, in the above embodiment, description has been given while taking, as an example, a case where the scrawl switch unit 24 of the present invention used to display menus is arranged together with the flat point 18 and the left and right click buttons 20 and 22 for operating the mouse pointer. It is, of course, possible to provide the scrawl switch unit 24 independently or separately.

For example, the scrawl switch unit with the defined button according to the present invention may be provided on an externally provided keyboard connected to a desk top machine. Alternatively, instead of the scrawl switch unit of the present invention, a wheel-added multifunctional mouse capable of carrying out a scrawling operation and a definition operation may be employed. This wheel is provided with the third button in addition to the left and right buttons. As stated so far, according to the present invention, peculiar menu information corresponding to applications are stored in the menu storage unit, an application which is now running by the menu development unit is discriminated, and a menu corresponding to each application is developed on a screen by using stored menu information. Due to this, it is possible to dispense with moving the mouse pointer to operate a menu by the operation of the flat point or the mouse for each menu item on the menu bar is provided on, for example, the upper unit on the application screen as usually seen, to thereby simply, easily operate menus and to efficiently carry out operations. As for an application requiring frequent menu selection operation such as the Internet view application and the electronic mail software, in particular, the menu processing function provided by the present invention allows a user to make a menu selection as desired and to execute the menu promptly, rhythmically with the less movement of fingers, thereby making the development, selection and execution of the menus quite convenient. Furthermore, according to the present invention, by depressing the defined button arranged between the scrawl-up and scrawl-down buttons on the menu, the menu of an application is developed and displayed. By selecting a menu item using the scrawl-up or scrawl-down button and depressing the defined button, it is possible to select a menu item and to start a program and to thereby simply, easily and efficiently operate the menu only by the action of fingertips.

What is claimed is:

1. An information processing apparatus, comprising:
 a menu storage unit storing characteristic menu information including a plurality of commands corresponding to applications;
 a menu window displaying a first menu using the characteristic menu information stored in said menu storage unit, the first menu allowing activation of an application; and
 a menu development unit which discriminates an application that is activated and causes the menu window to display a second menu using said characteristic menu information corresponding to the discriminated application
 wherein if no characteristic menu information corresponds to the discriminated application, said menu development unit determines which commands among commands for the active application are executable using key codes and said determined commands are used for the characteristic menu information.

2. An information processing apparatus according to claim 1, further comprising a menu execution unit executing a processing corresponding to a menu item selected from said second menu.

3. An information processing apparatus according to claim 1, wherein if a menu item is selected from said first menu or said second menu, the respective first or second menu is deleted from the screen.

4. An information processing apparatus according to claim 1, wherein the information processing apparatus comprises an indication unit indicating display of said first menu and said menu development unit discriminates the application activated if an indication of said indication unit is detected.

5. An information processing apparatus according to claim 4, wherein said indication unit is a device consisting of a scroll-up button and a scroll-down button for changing selection of the menu item from said first menu and a defined button for determining the selected menu item.

6. An information processing apparatus according to claim 5, wherein said defined button is operated to thereby indicate the display of said second menu.

7. An information processing apparatus according to claim 5, wherein said defined button is arranged between said scroll-up button and said scroll-down button.

8. An information processing apparatus according to claim 5, wherein said scroll-up button and said scroll-down button are a seesaw switch provided with a pair of switch contacts operating by depressing one of operation regions on both ends of a switch knob, and said defined button is a push button switch arranged in a hole formed at a center of said switch knob.

9. An information processing apparatus according to claim 4, wherein said indication unit is provided in front of a keyboard.

10. An information processing apparatus according to claim 9, wherein the information processing apparatus comprises:
 a cover on which a display is arranged;
 a main body on which said keyboard is arranged; and
 a coupling section coupling the cover to the main body.

11. An information processing apparatus comprising:
 a menu storage unit storing characteristic menu information corresponding to a plurality of applications;
 a menu window displaying a first menu using the characteristic menu information stored in said menu storage unit, the first menu allowing activation of an application; and
 a menu development unit discriminating whether at least one of the plurality of applications is active and displaying a second menu corresponding to the discriminated application using said characteristic menu information;
 wherein if no characteristic menu information corresponds to the discriminated application, menu development unit determines which commands among commands for the active application are executable using key codes and said determined commands are used for the characteristic menu information, and
 wherein said second menu allows selecting and activating at least one other of the plurality of applications.

12. An information processing apparatus comprising:
 a menu development unit discriminating whether at least one of a plurality of applications is being executed and displaying a menu corresponding to the discriminated at least one application using characteristic menu information corresponding to the at least one application,
 wherein if no characteristic menu information corresponds to the discriminated application, said menu development unit determines which commands among commands for the active application are executable using key codes and said determined commands are used for the characteristic menu information.

13. An information processing apparatus according to claim 12, wherein no application is being executed, the menu development unit displays a launcher menu for starting the applications.

14. A menu processing method for displaying a menu on a screen, comprising:
 discriminating whether at least one of a plurality of applications is being executed; and
 displaying a menu corresponding to the discriminated application using the characteristic menu information corresponding the discriminated application, menu items of the menu being composed of commands of the discriminated application that are executable using key codes serving as commands in applications, wherein if no characteristic menu information corresponds to the discriminated application a predetermined menu is displayed.

15. A menu processing method according to claim 14, comprising executing a processing corresponding to a menu item selected from said menu.

16. A menu processing method according to claim 14, wherein if a menu item is selected from said menu, the menu is deleted from the screen.

17. A menu processing method according to claim 14, comprising indicating display of said menu, and the executing application is discriminated if an indication is detected.

18. A menu processing method for displaying a menu on a screen comprising:
- discriminating whether at least one of a plurality of applications is being executed; and
- displaying a menu corresponding to the discriminated application based on a discriminating result while using characteristic menu information corresponding to a plurality of applications;
- wherein if no characteristic menu information corresponds to the discriminated application, commands of the discriminated application that are executable using key codes are used for the characteristic menu information, and
- wherein if the discriminated application for which said menu information exists is being executed, at least one other of the plurality of applications is selected from the menu of the executing application and activated.

19. A menu processing method for displaying a menu on a screen, comprising:
- discriminating whether at least one of a plurality of applications is being executed; and
- displaying a menu corresponding to the at least one discriminated application based on a discriminating result while using characteristic menu information corresponding to a plurality of applications,
- wherein if no characteristic menu information corresponds to the discriminated application, commands of the discriminated application that are executable using key codes are used for the characteristic menu information.

20. A menu processing method according to claim 17, wherein if no application is being executed, the menu development unit displays a launcher menu for starting the applications.

21. A computer readable recording medium recording a menu processing program, the menu processing program allowing a computer to execute the operations of:
- discriminating whether at least one of a plurality of applications is being executed; and
- displaying a menu corresponding to the discriminated application based on a discriminating result while using said characteristic menu information corresponding to a plurality of applications, the characteristic menu information being used to configure menu items composed of commands of the discriminated application that are executable using key codes and serving as commands in the plurality of applications, wherein if no characteristic menu information corresponds to the discriminated application, a predetermined menu is displayed.

22. A computer readable recording medium according to claim 21, wherein said menu processing program conducts a processing corresponding to a menu item selected from said menu.

23. A computer readable recording medium according to claim 21, wherein if a menu item is selected from said menu, said menu processing program deletes the menu from the screen.

24. A computer readable recording medium according to claim 21, wherein an indication of display of said menu is detected, and the executing application is discriminated if said indication is detected.

25. A computer readable recording medium recording a menu processing program allowing a computer to execute the operation of:
- discriminating whether at least one of a plurality of applications is being executed; and
- displaying a menu corresponding to the discriminated application based on a discriminating result while using characteristic menu information corresponding to a plurality of applications;
- wherein if the discriminated application for which said menu information exists is being executed, at least one other of the plurality of applications is selected from the executing discriminated application and activated, and
- wherein if no characteristic menu information corresponds to the discriminated application, commands of the discriminated application that are executable using key codes are used for the characteristic menu information.

26. A computer readable recording medium recording a menu processing program allowing a computer to execute the operation of: discriminating whether at least one of a plurality of applications is being executed; and
- displaying a menu corresponding to the discriminated application based on a
- discriminating result while using characteristic menu information corresponding to the plurality of applications;
- wherein if an application, for which said menu information does not exist, is being executed, commands of the discriminated application that are executable using key codes are used for the characteristic menu information.

27. A computer readable recording medium according to claim 26, wherein if no application is being executed, the menu development unit displays a launcher menu for starting the applications.

28. A menu processing method, comprising:
- storing menu characteristic information corresponding to a plurality of applications, the menu characteristic information being used to configure menu items composed of key codes serving as commands in applications;
- determining whether an activated control activates at least one of the plurality of applications; and
- displaying a menu for the activated application where the menu includes the menu items configured based on the menu characteristic information corresponding to the activated application, wherein if no characteristic menu information corresponds to the activated application, commands of the discriminated application that are executable using key codes are used for the characteristic menu information.

29. An information processing method, comprising:
- storing characteristic menu information corresponding to a plurality of applications, the characteristic menu information being used to configure menu items composed of key codes serving as commands in applications;
- performing a test to determine whether at least one of the plurality of applications is executing; and
- displaying a menu corresponding to the at least one executing application on a screen using said menu items when the test determined the at least one executing application wherein if no characteristic menu information corresponds to the at least one executing application, commands of the discriminated application that are executable using key codes are used for the characteristic menu information.

30. An information processing apparatus, comprising:

storing characteristic menu information corresponding to a plurality of applications, the characteristic menu information being used to configure menu items composed of key codes serving as commands in applications;

discriminating whether at least one of the plurality of applications is started and displaying a menu corresponding to the started application on a screen using said menu items; and displaying commands of the discriminated application that are executable using key codes when no characteristic menu information corresponding to the started application is stored.

31. A system, comprising:

a storage storing application menus of applications that run in different screens and an application launcher menu, the application launcher menu being composed of key codes serving as commands in applications;

a menu activation button; and a computer and display system performing a test to determine if an application corresponding to a menu of the application menus is executing and displaying the menu corresponding to the executing application when the application corresponding to the menu of the application menus is executing and displaying the application launcher menu when an application corresponding to one of the application menus is not executing, and wherein if no menu corresponding to the executed application exists, a predetermined menu is displayed.

* * * * *

UNITED STATES PATENT AND TRADEMARK OFFICE
CERTIFICATE OF CORRECTION

PATENT NO.       : 7,308,654 B2
APPLICATION NO.  : 09/765633
DATED            : December 11, 2007
INVENTOR(S)      : Masato Ageta et al.

Page 1 of 1

It is certified that error appears in the above-identified patent and that said Letters Patent is hereby corrected as shown below:

Column 12, Line 26, before "menu" insert --said--.

Column 12, Line 46, before "no" insert --if--.

Title page, Column 2 under item (56) (FOREIGN PATENT DOCUMENTS), after
"WO        98/43202      10/1998" insert
--JP       01100620      4/1989
JP         02133819      5/1990
JP         04127222      04/1992
JP         06202836      07/1994--.

Signed and Sealed this

Second Day of September, 2008

JON W. DUDAS
*Director of the United States Patent and Trademark Office*